United States Patent [19]
Hoy

[11] Patent Number: 5,825,861
[45] Date of Patent: Oct. 20, 1998

[54] TELECOMMUNICATIONS NETWORKS

[75] Inventor: Michael D. Hoy, Suffolk, England

[73] Assignee: British Telecommunications plc, London, Great Britain

[21] Appl. No.: 672,667

[22] Filed: Jun. 28, 1996

[30] Foreign Application Priority Data

Mar. 5, 1996 [GB] United Kingdom .................... 9604675

[51] Int. Cl.⁶ .................................................. H04M 15/00
[52] U.S. Cl. ........................ 379/134; 379/113; 379/133; 379/137; 379/92.03; 379/106.08
[58] Field of Search ..................................... 379/111, 112, 379/113, 133, 134, 137, 138, 139, 201, 207, 220, 221, 242, 92.01, 92.02, 92.03, 92.04, 106.03, 106.07, 106.08

[56] References Cited

U.S. PATENT DOCUMENTS

| | | | |
|---|---|---|---|
| 4,224,479 | 9/1980 | Crawford | 379/113 |
| 4,672,602 | 6/1987 | Hargrave et al. | 379/93.01 |
| 4,696,029 | 9/1987 | Cohen | 379/92.02 |
| 4,974,256 | 11/1990 | Cyr et al. | 379/113 |
| 5,042,064 | 8/1991 | Chung et al. | 379/113 |
| 5,060,258 | 10/1991 | Turner | 379/113 |
| 5,067,074 | 11/1991 | Farel et al. | 379/113 |
| 5,295,183 | 3/1994 | Langlois et al. | 379/113 |
| 5,425,088 | 6/1995 | Hidaka et al. | 379/113 |

FOREIGN PATENT DOCUMENTS

| | | |
|---|---|---|
| 0334612 A1 | 9/1989 | European Pat. Off. . |
| 0340665 A2 | 11/1989 | European Pat. Off. . |
| 0687116 A2 | 12/1995 | European Pat. Off. . |
| WO 93/07722 | 4/1993 | WIPO . |

OTHER PUBLICATIONS

Waters et al, "Congestion Control For Frame Relay Networks", IEE Colloquim on Frame Relay –digest No. 096, 22 Apr. 1992, London (GB), pp. 3/1–3/4, XP002010407.

Chemouil et al, "Integrated Network Management and Control", Computer Networks and ISDN Systems, vol. 20, No. 1/5, Dec. 1990, Amsterdam (NL), pp. 143–153, XP000161279.

Williams, "Implications for Signalling Network Development Automatic Focused Overload Control", IEE Colloqium on Developments in Signalling–Digest No 1993/221 –Paper 6, 22 Nov. 1993, London (GB), pp. 1–5, XP000443995.

Tokunaga et al, "Traffic Congestion Control Based on Call Density Control", Electronics and Communications in Japan–Part I, vol. 72, No. 5, May 1989, New york (US), pp. 96–107, XP000085035.

Farel et al, "Design and Analysis of Overlad Control Strategies for Transaction Network Database", Proceedings of the Thirteenth International Teletraffic Congress, 19–26 Jun. 1991, Copenhagen (DK), pp. 115–120, XP000303017.

*Primary Examiner*—Curtis A. Kuntz
*Assistant Examiner*—Binh K. Tieu
*Attorney, Agent, or Firm*—Nixon & Vanderhye, P.C.

[57] ABSTRACT

In a telecommunications network of the kind which handles non-time-critical calls (NTCC) in addition to normal telephony, a congestion indication is transmitted to NTCC transmitting platforms if volume and/or rate limit for a particular communications route or switch is exceeded. Transmitting platforms (9,10,11) establish a transmission rate based on a gapping ration (GR). On receipt of a congestion signal the platforms calculate and Inter call delay based on a random number multiplied by a weighting factor determined from the current value of GR. This provides a period during which calls are not attempted after which GR is adjusted using a common ratio to provide a higher value of GR thus transmission rate (or the rate at which calls are offered) to the congestion route is less onerous. Consecutive call failures result in a rapid increase in the value of GR leading to longer ICDs (to allow the congested route/switch to recover) and a lower traffic loading on recovery. Further, multiple transmitting platforms resume sending at different times due to randomisation of ICD's across platforms.

30 Claims, 1 Drawing Sheet

TELECOMMUNICATIONS NETWORKS

BACKGROUND OF THE INVENTION

1. Field of the Invention

The present invention relates to telecommunications networks and more particularly to such networks of the kind adapted to provide non intrusive telephony related services to customers premises.

2. Description of Related Art

The public switched telecommunications network (PSTN) has developed from a system which carries only voice communication to one adapted to carry facsimile messages and data communications. Much of this development was accomplished using space switching techniques and analog signalling in which end-to-end communication was, for all intents and purposes, along a pair of dedicated wires for the duration of the end-to-end communication.

The quality of communication was improved by for example digitizing speech signals using pulse code modulation for example so that deterioration of the analog signal due to resistive and capacitive effects could be compensated for making communication over much longer distances possible. Once digitization of speech signals became common practice part of the communications network could be more effectively used by compressing several calls onto one main communication route using time division multiplexing techniques. Initially most of the switching was still carried out using space division techniques physically switching the connection between one pair of wires and another.

Further development in digital switching techniques lead to substantially improved networks and the major PSTN in the United Kingdom is substantially digital from the local exchange. In a digital network it is possible to provide many more services to end customers. For example by using techniques to activate terminals at the customer's premises selectively and without effecting alert of customer telephones or related equipment responsive to a ringing current, telemetry, remote control, messaging and other services can be provided.

As the number of such services grow for example telemetry operations may be provided by a number of different operators, the possibility of a focused overload on a particular route increases. Thus if coincidentally gas, water and or electricity meter reading requests together with advertising to messaging terminals were to arrive in a very short period of time at one particular exchange telephony service could be adversely degraded by the presence of non-time critical service offering.

Where the network operator is the sole provider of non-time critical services such a clash can be avoided by the network operators own management systems ensuring that the distribution of such calls is reasonable having regard to normal telephony demands of local exchanges. However, regulation and competitive service requirements of such regulations to avoid monopoly misuse require PSTN operators to grant network access to other licensed network operators (OLOs).

Similarly, where competing PSTN services are offered by several network operators in a locality the telemetry service operator on one network will require access to persons whose lines appear only on another network so that a complete service can be provided for all potential customers. As call distribution capability moves away from a particular PSTN operator then some method of restricting focused overload is required.

SUMMARY OF THE INVENTION

According to the present invention there is provided a telecommunications network comprising a plurality of switching units interconnected to provide telephony service to customers and having network access points for a plurality of service platforms providing Non-Time Critical Communication (NTCC) services characterised in that each switching unit is allocated a volumetric limit for NTCCs and, on receipt of a NTCC which causes the limit to be exceeded, transmits a congestion indication to the originating service platform, each service platform on receipt of a congestion indication commencing a time out determined by a multiplying a random number (RN) by a weighting factor (W) determined from a current gapping rate (GR) to produce a value of intercall delay (ICD) which determines a period during which the service platform offers no NTCCs to the congested switching unit.

Preferably the value of GR is compared against upper and lower band limits of a series of bands each band providing a respective W which substantially increases the period during which NTCCs are not attempted.

Each platform offers NTCCs to a switching unit sequentially at a rate determined by GR and after expiry of the period determined by ICD the value of GR is adjusted so that the period between sequential calls from the respective platform is increased.

After "N" successful offerings of NTCCs by a platform (where N is an integer of at least one) the value of GR may be adjusted so that the period between sequential call offerings is reduced. The value of GR may be bounded to limit the maximum rate of call offering or the maximum value of ICD.

A feature of the invention provides a telecommunications service platform which generates non time critical calls including control means responsive to a congestion indication received from a telecommunications network to restrict or delay the offering of NTCCs to specified destinations of the network.

BRIEF DESCRIPTION OF THE DRAWINGS

A telecommunications network in accordance with the invention will now be described with reference to the accompanying drawing.

DETAILED DESCRIPTION OF EXEMPLARY EMBODIMENTS

Figure 1:
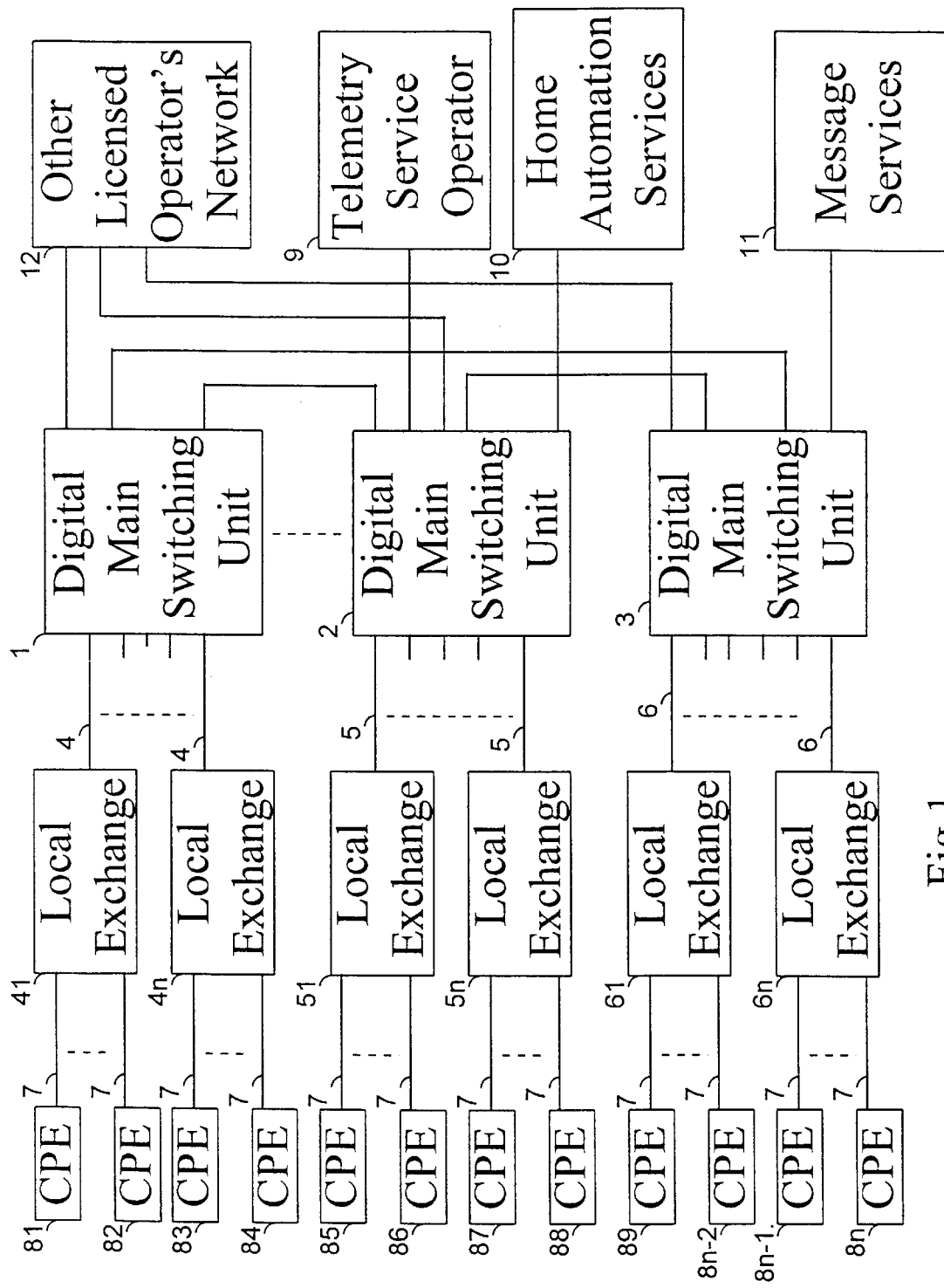
FIG. 1 shows a telecommunications network according to the present invention.

Referring to the drawing a typical PSTN comprises a multiplicity of Digital Main Switching Units (DMSUs) represented by DMSUs 1, 2 and 3. Each DMSU is connected to a plurality of local exchanges 4/1 to 4/n, 5/1 to 5/n, 6/1 to 6/n which exchanges are connected to provide individual telephony service through local lines 7 to customer premises equipment 8/1 to 8/n.

As so far described the system is representative of many digital switched telecommunications networks. However, some digital networks, for example that provided by BT in the United Kingdom habve the ability to use C7 signalling across the network to indicate to the local exchanges that a call being offered is of the no ring type, that is a call connection by way of the local loop 7 to customer premise equipment which can be alerted by use of line reversal and/or current signalling techniques. Networks of this kind are discussed in our co-pending patent application Ser. No. PCT/GB95/00853

An advantage of this kind of facility is that the network operator may offer access to the customer premises for connection to specialised equipment such as meter reading units, messaging terminals ETG E-mail display terminals or other services such as that disclosed in co-pending patent application number GB960096.3.

Other operators of similar services for example an independent telemetry service operator 9 or home automation service 10 or message service provider 11 may request access to customers of the PSTN operator. Further, other licensed operators 12 having network access through DMSUs 1, 2 and 3 may have similar service operators (not shown) accessing the network through the OLO access.

It will be appreciated that these reciprocal arrangements between major network operators are required in order to provide a complete service to e.g. telemetry service operator 9 otherwise customers of the service will need to subscribe to a service on each network. Thus reciprocal arrangements between network operators through interconnection agreements are usually put into place.

Telemetry service and certain message services (e.g. advertising services) and some home automation type accesses are normally of a non-time critical nature. In practice where the PSTN operator provides a telemetry service to other utilities for example to electricity, gas or water suppliers it is usual for the non time critical access to the CPE or meter reading to be carried out at quiet periods. This avoids causing serious network congestion. Further, where the PSTN operator is also a service provider a network management system is able to pin point areas of congestion within the network so that non time critical communications are not made through congested exchanges.

Once access control through the DMSUs 1, 2 and 3 is granted to other operators of non time critical services then a more specific control of these services is required since more than one of the service platforms 9, 10 and 11, either directly of through the other licensed operators network 12, will be seeking to access the same local switching group at the same time.

Now assuming that each of the local exchanges, 41–4N, 51–5N, 61–6n has a control unit responsive to C7 signalling from its DMSU 1 by way of a digital trunk route 4, 5, 6 each local exchange control unit has a rate limit and a maximum volume set. A rate limit determines the maximum number of calls per minute which the exchange will handle while the volume limit determines the maximum of calls which may be progress at the same time. Similarly, the DMSU will have for each of the routes say 4, a rate and volume limit.

Where either the local exchange say 41 or the DMSU 1 respectively determines that a call offered by e.g. the telemetry service platform 9 for one of the customers 81, 82 will cause the volume or rate limit to be exceeded it will return C7 signalling indicative of congestion.

If the respective service platform 9, 10 and 11 receives an exchange congestion signal while attempting a call to a particular local exchange call 1 the congestion back up algorithm is applied. For the purposes of description each of the platforms 9, 10 and 11 is referred to as a TP and within the TP up to the point at which the congestion signal is received from the network call rate limiting is applied on a per local exchange for example on the basis of the expression call gapping rate equals k/n where n is an integer and k is a constant in which k/n when rounded up to the nearest 100 millisecond period defines the period between successive non-critical call offerings to the respective local exchange 41. In the United Kingdom k is 5 since the force release period adopted by the main PSTN operator is 5 seconds. The invention is not however limited to such a period.

On receipt of line congestion control means within the TP determines a random number based on a seed of 10 (e.g. RND 10). Using the current intercall gapping rate (GR) the control now applies the random number in accordance with the following table.

| Current Call Gapping (GR) in seconds for congested DLE | Delay to next call attempt |
| --- | --- |
| 0 < GR < 1 | RND (10) × 0.1 sec |
| 1 < GR < 10 | RND (10) × 1 sec |
| 10 < GR < 100 | RND (10) × 10 sec |
| 100 < GR < 1000 | RND (10) × 100 sec |

The application of a random number based on a seed ensures that if several service platforms are transmitting to a particular local exchange 41 and each receives a back off congestion signal at the same time the platforms each attempt to connect a non time critical call after a different delay.

After applying the delay described above the TP resumes offering calls to the local exchange 41 but with a longer delay period namely 2×5/n or 10/n second intercall delay. Thus the rate of which calls are now offered by the respective TP to the local exchange is half that of the attempt rate prior to receiving congestion indication. Further failures will result in a geometric increase in GR with a common factor of 2.

If after applying the call delay and before further modification of GR a further congestion indication is received a new intercall delay is calculated as described in accordance with the table above and is applied prior to attempting to resume calling at 50% of the new prevailing rate.

Thus each time successive call attempts result in congestion indication being returned either from a DMSU or from a local exchange the period before a further call is offered by the respective TP to the respective local exchange increases and the rate at which successive calls are offered is reduced.

As the resumption of calling from a number of TPs is staggered by virtue of the random number then the build up of non-time critical traffic through a local exchange is staggered when congestion caused by the volume or rate limit excess has cleared.

Once a telephony platform has succeeded in offering a number of calls successfully to the same local exchange say 41 without further congestion occurring then the rate at which calls are offered may be progressively doubled until the value of GR reaches the predetermined value of 5 over n.

Note that the maximum value of GR is limited so that after the intercall delay of RND (10×100) has been applied if the gapping rate exceed 999 seconds then the period between calls will not be further increased as a result of additional congestion messages.

The algorithm above has more than one source of random behaviour inherent therein as multiple circuit or accesses to the local exchange are possible. As a succession of calls to one of the exchanges which brought about exchange congestion will in general all have been originated at a different time and will have encountered congestion at a different absolute time, the respective intercall delays from different platforms and the period during which calls are not offered from different platforms will vary.

Only small increases in inter call delay occur where short term congestion applies. Where much longer delays are necessary where long-term no ring call volume or connected congestion is encountered reasonably rapid recovery to normal intercall delay occurs when an exchange congestion situation is no longer present. It will be noted that the DMSUs and/or local exchanges may be programmed to vary the volume and/or rate limit values for non-time critical calls where the presence of telephony or other time critical call volume has increased.

I claim:

1. A telecommunication network comprising:
   a plurality of switching units interconnected to provide telephony service to customers connected by respective customer lines to at least some of said switching units;
   at least one service platform connected to the network;
   some of said customer lines being connected to receive non time critical calls from said at least one service platform;
   each of said switching units being allocated a volumetric limit for non time critical calls generated by said at least one service platform, each said switching unit including means responsive to receipt of a non time critical call to determine if said call causes the volumetric limit to be exceeded, and if the volumetric limit is exceeded, to transmit a congestion indication to the at least one service platform which generated the call;
   each of said at least one service platforms including means responsive to receipt of a congestion indication to commence a time out determined by multiplying a respective random number (RN) by a weighing factor (W) determine from a current gapping rate (GR) to produce a value of intercall delay (ICD) which determines a respective period during which the respective service platform offers no non time critical calls to the respective switching unit which generated the congestion indication.

2. A telecommunications network as claimed in claim 1, wherein the value of GR is compared against upper and lower band limits of a series of bands each band providing a respective W which substantially increases the period during which non time critical calls are not attempted.

3. A telecommunication network as claimed in claim 1, wherein each platform offers non time critical calls to a switching unit sequentially at a rate determined by GR.

4. A telecommunications network as claimed in claim 3, wherein after expiry of the period determined by ICD the value of GR is adjusted so that the period between sequential calls from the respective platform is increased.

5. A telecommunications network as claimed in claim 4, wherein after "N" successful offerings of non time critical calls by a platform (where N is an integer of at least one) the value of GR is adjusted so that the period between sequential call offerings is reduced.

6. A telecommunications network as claimed in claim 5, wherein the value of GR returns to the value held immediately prior to the last received congestion indication.

7. A telecommunications network as claimed in claim 6, wherein after each successive "N" successful offerings of non time critical calls, the value of GR progressively returns to values held prior to receipt of sequential congestion indications.

8. A telecommunications network as claimed in claim 1, wherein the value of GR is bounded to limit the maximum rate of call offering.

9. A telecommunications network as claimed in claim 1, wherein the value of GR is bounded to limit the maximum value of ICD.

10. A telecommunications service platform for connection to a telecommunications network the service platform generating non time critical calls which communicate by way of the telecommunications network to customer premises equipment connected to customer telephone lines of the network, the network including means to transmit a congestion indication if volumetric limits of calls of a specified type are exceeded, the service platform comprising;
    control means respective to said congestion indication to restrict or delay the offering of non time critical calls to a respective congested destination which caused transmission of the congestion indication, the control means commencing a time out determined by multiplying a respective random number (RN) by a weighting factor (W) determined from a current gapping rate (GR) for said respective congested destination to produce a respective value of intercall delay for determining a period during which the service platform offers no calls to the network for the congested destination.

11. A telecommunication service platform as claimed in claim 10, wherein the value of GR is compared against upper and lower band limits of a series of bands each band providing a respective W which substantially increases the period during which non time critical calls are not attempted.

12. A telecommunication service platform as claimed in claim 11, wherein the platform offers non time critical calls to a predetermined destination sequentially at a rate determined by GR.

13. A telecommunication service platform as claimed in claim 12, wherein after expiry of the period determined by ICD the value of GR is adjusted so that the period between sequential calls to the respective destination is increased.

14. A telecommunications service platform as claimed in claim 13, wherein after "N" successful offerings of non time critical calls to a previously congested destination (where N is an integer of at least one) the value of GR is adjusted so that a period between sequential call offerings is reduced.

15. A telecommunications service platform as claimed in claim 14, wherein the value of GR returns to the value held immediately prior to the last received congestion indication.

16. A telecommunications service platform as claimed in claim 15, wherein after each successive "N" successful offerings of non time critical calls, the value of GR progressively returns to values held prior to receipt of sequential congestion indications.

17. A telecommunication service platform as claimed in claim 10, wherein the value of GR is bounded to limit the maximum rate of call offering.

18. A telecommunications service platform as claimed in claim 10, wherein the value of GR is bounded to limit the maximum value of ICD.

19. In a telecommunications network comprising a plurality of switching units interconnected to provide telephony services to customers and at least one service platform connected to the network, wherein some of the customer lines are connected to receive non time critical calls from the service platform, a method for controlling congestion caused by the non time critical calls comprising the steps of:
    allocating a volumetric limit for non time critical calls generated by the service platform to each switching unit of the network;
    receiving a non time critical call that causes the volumetric limit of a particular switch to be exceeded;
    transmitting a congestion indication from the switch whose volumetric limit has been exceeded to the service platform that initiated the non time critical call; and applying a time out to the service platform during which the service platform offers no non time critical calls to the congested switch.

20. The method as claimed in claim 19, wherein the time out is determined by multiplying a random number (RN) by a weighting factor (W) determined from a current gapping rate (GR) to produce a value of intercall delay (ICD).

21. The method as claimed in claim 20, further comprising;

comparing the value of GR against upper and lower band limits of a series of bands, each band providing a respective W which substantially increases the period during which non time critical calls are not attempted.

22. The method as claimed in claim 20 wherein each platform offers non time critical calls to a switching unit sequentially at a rate determined by GR.

23. The method as claimed in claim 22, further comprising:

adjusting the value of GR after expiration of the period determined by ICD wherein the period between sequential calls from a respective platform is increased.

24. The method as claimed in claim 23, wherein after N successful offerings of non time critical calls by a platform, the value of GR is adjusted so that the period between sequential call offerings is reduced.

25. The method as claimed in claim 24, further comprising:

returning the value of GR to the value held immediately prior to the last received congestion indication.

26. The method as claimed in claim 25, wherein after each successive N successful offerings of non time critical calls, the value of GR progressively returns to values help prior to receipt of sequential congestion indications.

27. The method as claimed in claim 20, wherein the value of GR is bounded to limit the maximum rate of call offering.

28. The method as claimed in claim 20, wherein the value of GR is bounded to limit the maximum value of ICD.

29. A telecommunications network comprising:

a plurality of switching units interconnected to provide telephony service to customers connected by customer lines to at least some of said switching units;

at least one service platform connected to the network, wherein some of said customer lines are connected to receive non time critical calls from said service platform;

each switching unit being allocated a volumetric limit for non time critical calls, and including means responsive to receipt of a non time critical call to determine if said non time critical call causes the volumetric limit to be exceeded, and if the volumetric limit is exceeded, to transmit a congestion indication signal to the service platform tat generated the call; and each service platform including means responsive to receipt of said congestion indication signal to perform a time out.

30. The telecommunications network as claimed in claim 29, wherein said time out is determined by multiplying a respective random number (RN) by a weighting factor (W) determined from a gapping rate (GR) to produce a value of intercall delay (ICD), which determines a respective period during which the respective service platform offers no non time critical calls to the switching unit that generated the congestion indication signal.

* * * * *